Figure 1:
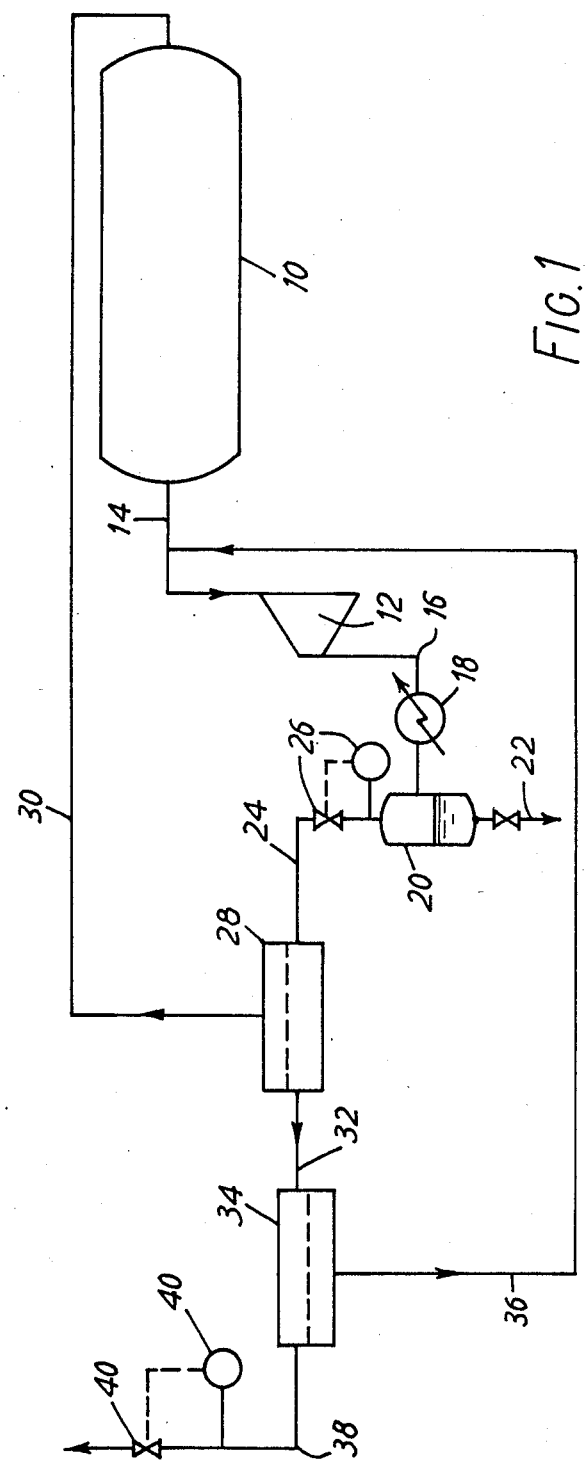

United States Patent [19]

Czarnecki et al.

[11] Patent Number: 4,675,030
[45] Date of Patent: Jun. 23, 1987

[54] PURIFICATION OF HELIUM

[75] Inventors: Bogdan A. Czarnecki, Westhoughton; David I. Limb, Stockport, both of United Kingdom

[73] Assignee: Costain Petrocarbon Limited, Manchester, England

[21] Appl. No.: 713,572

[22] Filed: Mar. 18, 1985

[30] Foreign Application Priority Data

Oct. 11, 1983 [GB] United Kingdom ............... 8327143
Jul. 29, 1984 [GB] United Kingdom ............... 8419090

[51] Int. Cl.4 ........................................... B01D 53/22
[52] U.S. Cl. ........................................... 55/16; 55/23; 55/68; 55/158
[58] Field of Search ....................... 55/16, 23, 68, 158

[56] References Cited

U.S. PATENT DOCUMENTS

| 2,540,152 | 2/1951 | Weller | 55/16 |
| 3,085,379 | 4/1963 | Kiyonaga et al. | 55/23 |
| 3,172,741 | 3/1965 | Jolley | 55/16 |
| 3,246,449 | 4/1966 | Stern et al. | 55/16 |
| 3,250,080 | 5/1966 | Garwin | 55/16 X |
| 3,256,675 | 6/1966 | Robb | 55/16 |
| 3,324,626 | 6/1967 | Dresser et al. | 55/16 |
| 3,350,844 | 11/1967 | Robb | 55/16 |
| 3,713,271 | 1/1973 | Franz et al. | 55/16 |
| 4,239,507 | 12/1980 | Benoit et al. | 55/158 X |
| 4,482,360 | 11/1984 | Taketomo et al. | 55/158 X |

FOREIGN PATENT DOCUMENTS

| 637837 | 9/1963 | Belgium | 55/23 |
| 724479 | 12/1965 | Canada | 55/16 |
| 1017637 | 9/1963 | United Kingdom . | |
| 1059945 | 11/1963 | United Kingdom . | |
| 1115413 | 9/1965 | United Kingdom . | |

Primary Examiner—Robert Spitzer
Attorney, Agent, or Firm—Browdy and Neimark

[57] ABSTRACT

Helium contaminated with minor amounts of air, water vapor and carbon dioxide and from an envelope (10) is compressed in a compressor (12) and thereafter cooled in cooler (18) and fed via water separator (20) to a first of two substantially helium-permeable, oxygen/nitrogen-impermeable membranes (28,34), the permeate from which is substantially pure helium. The impermeate still containing helium is fed to the second membrane (34), the permeate from which is recycled to the first membrane while the impermeate is rejected with little loss of helium. The method is useful in purifying helium in an airship or balloon.

12 Claims, 2 Drawing Figures

PURIFICATION OF HELIUM

This invention relates to the purification of helium gas, particularly of helium gas contaminated with air.

In airships and balloons which are filled with helium, being a gas of low specific gravity to provide the required buoyancy and not being flammable, air progressively diffuses through the envelope and contaminates the helium retained therein. This reduces the buoyancy of the aircraft as even small admixtures of air exert a strong influence on the specific gravity. In the course of some weeks the air content of the envelope may rise to around 5% and this raises the specific gravity of the charge by 31%.

Moreover, since the material used in the envelope is even more permeable for water vapour and carbon dioxide than for air, at the end of this period the envelope may contain these substances in approximately the same concentrations as the surrounding atmosphere.

In view of the relatively high cost of helium, and the considerable quantities required, it is economically justifiable to purify the helium when it has become contaminated rather than to jettison it and introduce a fresh charge. This is normally carried out by cooling the contaminated helium at high pressure to a low temperature, thereby liquefying the bulk of the air, and removing the residual air by adsorption, also at low temperature, on molecular sieves or similar material.

Since this requires cooling to at least the temperature of boiling nitrogen, as well as compression to fairly high pressures, the procedure is expensive and complicated.

Moreover, when, as in this case, the helium is also contaminated with $CO_2$ and water vapour, the gas has to be dried to a low dewpoint and the $CO_2$ removed before the contaminated gas is cooled to the low temperature.

It is an object of the invention to provide a simple and relatively inexpensive process for periodically purifying the helium content of the envelopes of airships and balloons.

It is a further object of the invention to provide an apparatus for carrying out the process, which can be installed on a vehicle and moved from one location to another as may be required from time to time.

The invention utilises the fact that certain commercially available membranes, essentially modified reverse osmosis membranes, of the spiral wound or hollow fibre configuration, using cellulose esters as the polymer phase, are very permeable for helium and much less permeable for nitrogen and oxygen. Membranes of this type or such as are otherwise substantially helium-permeable and oxygen/nitrogen impermeable, are referred to hereinafter as being of the type specified. It is a further feature of these membranes that their permeability for $CO_2$ is greater than for nitrogen and oxygen and that, although their permeability for water vapour is extremely high, any contact with liquid water has a deleterious effect on their properties.

Thus it is a further object of the invention to remove the water vapour with which the helium is contaminated but also to include means for preventing liquid water from contacting the membranes.

The use of semi-permeable membranes for increasing the helium content of a gas stream containing helium is known in the prior art, as taught, e.g. in British Pat. Nos. 1115413 and 1059945.

In accordance with the invention there is provided a method of purifying helium gas contaminated with air, water vapour and traces of carbon dioxide, the contaminants forming a minor amount of the gas and generally less than 10% by volume, the method comprising the steps of:

(1) compressing and thereafter cooling the contaminated helium to condense the bulk of the water vapour contained therein and withdrawing same as liquid water;

(2) rendering the thus dried contaminated helium above its dewpoint by expansion to a lower presure and/or by superheating;

(3) feeding the contaminated helium from step (2) at superatmospheric pressure over a first membrane of the type specified and returning the permeate as substantially pure helium; and (4) passing the residual impermeate gas at superatmospheric pressure over a second membrane of the type specified and returning the permeate, after compression, to pass over the first membrane and rejecting the residual impermeate gas.

The pressure to which the contaminated helium is compressed in step (1) is preferably sufficient not only to effect condensation of the bulk of the water vapour therein in the subsequent cooling step but also for the dried gas stream to be subsequently provided to the first membrane at a pressure which (a) permits the permeate to be recovered at a helium purity and pressure which is suitable for its return to the airship or balloon and (b) produces permeate from the second membrane at a pressure and composition which is similar to that of the contaminated helium being supplied to step (1) of the process.

Thus if a stream of contaminated helium containing some 5% of air is compressed to a suitable pressure, and is then passed over such a membrane, the resulting low pressure permeate with a helium content of about 99.5% can be returned to the envelope. If the residual stream, still at an elevated pressure, is then passed over a second membrane, the second residual stream, which will contain very little helium, can be discarded, and the permeate from this second stage can be recycled to the first stage, resulting in a very small helium loss. The membrane surfaces are preferably chosen in conjunction with the chosen pressure such that the permeate from the second membrane has approximately the same composition as the feed to the first membrane. The process in accordance with the invention also reduces the amount of water vapour and carbon dioxide that may have diffused into the envelope together with the principal air contaminants of oxygen and nitrogen.

The removal of water may be achieved by compressing the gas to a suitable pressure, which is suitably from 20 to 60 bar, preferably 40–50 bar and more preferably around 45 bar, removing the heat of compression in an aftercooler, cooling the gas suitably to a temperature in the range 0° to 60° C., preferably 30° to 50° C. and separating any water which may thereby have condensed. The gas may then be expanded to a somewhat lower pressure, e.g. about 25 bar, for supply to the first membrane.

The initial compression and subsequent cooling of the contaminated gas brings it below its dewpoint at ambient temperature and thus enables liquid water to be withdrawn. The subsequent pressure reduction, suitably to a pressure of less than 30 bar, brings the gas back above its dewpoint, since any liquid water in contact with the membrane can have a deleterious effect on its properties. However instead of reducing the pressure to bring the gas above its dewpoint the same result can be achieved by heating the gas, preferably to a temperature of from about 8° C. to 15° C. above its dewpoint temperature.

Figure 2:
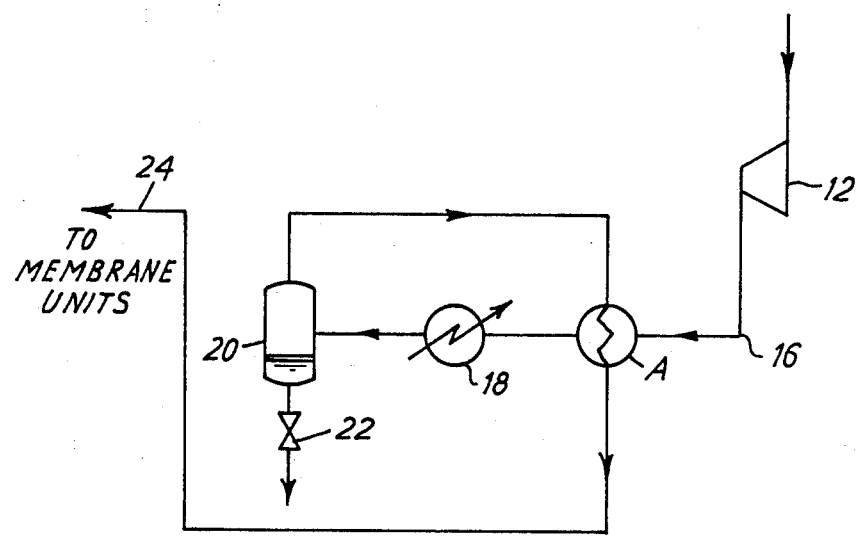

The invention is further described hereinafter with reference to the accompanying drawings in which:

FIG. 1 is a schematic diagram of apparatus for use in accordance with the invention; and FIG. 2 shows an alternative method of raising the gas above its dewpoint.

Referring to FIG. 1, helium contaminated with air and traces of carbon dioxide and water vapour subsists in envelope 10 of an airship or balloon (not shown). The gas subsist at near ambient pressure and is withdrawn from the envelope 10 into a compressor 12 via line 14. On compression the gas passes via line 16 and aftercooler 18 to water separator 20 from which condensed water is drained through line 22.

The dried gas then passes through line 24 and pressure-controlled valve 26, in which the pressure is reduced to a lower superatmospheric value above the dewpoint, to membrane unit 28. Purified permeate returns to the envelope 10 through line 30 at near atmospheric pressure.

The residue, with a reduced helium content, proceeds, still at elevated pressure, through line 32 to a second membrane unit 34, from which the permeate is recycled in line 36 to join the contaminated stream in line 14. The residue from the second membrane unit, containing very little helium, is vented through line 38 and pressure-controlled valve 40.

Referring now to FIG. 2 which shows an alternative arrangement, the gas before entering the aftercooler 18 on compression by compressor 12, passes through a heat exchanger A. Also, the cool gas leaving the water separator 20 having condensed liquid water therein, instead of being expanded by control valve 26, is heated to above its dewpoint by heat exchange in exchanger A with the hot compressed gas in line 16.

Although the embodiments described with reference to FIGS. 1 and 2 are shown as being two alternatives they could of course be employed together.

The invention is further illustrated with reference to the following example which deals with the case in which the purified helium returning in line 30 and the contaminated helium in envelope 10 do not mix, i.e. in which the boundary between pure helium and contaminated helium is assumed to move steadily along the length of the envelope 10. In fact some mixing will occur through internal diffusion, and this will have an effect on the time required to complete the purification. However, in most practical cases this effect will be small and will depend on the shape of the envelope and on the extent to which it is itself divided into separate compartments. It does not affect the concept of the invention.

EXAMPLE

The helium charge of an airship envelope, contaminated with 5% of air, is purified in accordance with the invention.

The volume of the envelope is 4250 m³. The flow-rate of gas from the envelope is 157 m³/hr and the period required for purification is 27 hours.

It is assumed that the contaminated gas in the envelope is saturated with water vapour at 15° C. and that it also contains 400 ppm of carbon dioxide.

The table below shows the conditions obtaining in the relevant streams.

TABLE 1

| Line<br>Composition | (1)<br>14<br>M % | (2)<br>30<br>M % | (3)<br>32<br>M % | (4)<br>36<br>M % | (5)<br>38<br>M % (6) |
|---|---|---|---|---|---|
| He | 94.94 | 99.55 | 70.00 | 95.68 | 5.00 |
| $N_2$ | 2.63 | 0.08 | 23.10 | 1.85 | 76.89 |
| $O_2$ | 0.71 | 0.12 | 6.70 | 2.25 | 17.96 |
| $H_2O$ | 1.68 | 0.22 | — | — | — |
| $CO_2$ | 0.04 | 0.03 | 0.20 | 0.22 | 0.15 |
|  | 100.00 | 100.00 | 100.00 | 100.00 | 100.00 |
| Flow kmol/hr | 6.63 | 6.31 | 0.77 | 0.55 | 0.22 |
| Pressure (Bar) | 1.5" wg | 1.36 | 23.0 | 1.36 | 22.0 |
| Temp. (°C.) | ambient | 40 | 40 | 40 | 40 |

Compressor delivery pressure 45 Bar absolute.
Notes
(1) = Gas exiting envelope 10
(2) = Permeate through membrane 28
(3) = Residue of membrane 28
(4) = Permeate through membrane 34
(5) = Residue of membrane 34 (vented)
(6) = Molar percentage The apparatus employed in this Example weighed 2350 kg and was very compact, with overall dimensions of 4.9 m long × 1.43 m wide × 1.2 m high, and was therefore readily capable of being mounted on a lorry or trailer. The compressor was driven by a diesel engine whose rate of fuel consumption was 11.5 kg/hr.

Instead of being recycled to line 14, the permeate from membrane 34 may be returned to join the feed in line 24 to the first membrane 28 but this would require the installation of a second compressor.

We claim:

1. A method of purifying helium gas containing air, water vapor and traces of carbon dioxide as contaminants and wherein said contaminants form not more than 10% by volume of the gas, the method comprising the steps of:
    (1) compressing the contaminated helium to between 20 and 60 bar and thereafter cooling it to between 0° and 60° C. to render the helium below its dewpoint and condense the bulk of the water vapor contained therein and withdrawing same as liquid water;
    (2) rendering the thus dried contaminated helium above its dewpoint by superheating or expansion to a lower pressure
    (3) feeding the contaminated helium from step (2) at superatmospheric pressure over a first membrane which is much less permeable for nitrogen and oxygen than it is for helium, to separate said contaminated helium into a permeate and a residual impermeate gas and recovering the permeate as substantially pure helium; and
    (4) passing the residual impermeate gas at superatmospheric pressure over a second membrane which is much less permeable for nitrogen and oxygen than it is for helium, to separate said residual impermeate gas into a second permeate and a second residual impermeate gas, and returning said second permeate, after compression, to pass over the first membrane and rejecting said second residual impermeate gas.

2. A method as claimed in claim 1 in which the contaminated helium is expanded in step (2) to a superatmospheric pressure of less than 30 bar, to render it above its dewpoint.

3. A method as claimed in claim 1 in which the contaminated helium is heated in step (2) to a temperature of from 8° to 15° C. in excess of its dewpoint temperature.

4. A method as claimed in claim 3 in which the contaminated helium is heated in step (2) by heat exchange with the contaminated helium compressed in step (1).

5. A method as claimed in claim 1 in which the permeate from the second membrane has a similar composition to the feed to the first membrane.

6. A method as claimed in claim 1 for purifying the helium contained in the envelope of an airship or balloon.

7. The method of claim 1 wherein said contaminated helium is pressurized to between 40 and 50 bar.

8. The method of claim 7 wherein said pressurized, contaminated helium is cooled to between 30° and 50° C. to render said helium below its dewpoint and condense water vapor.

9. Apparatus for purifying helium gas containing air, water vapor and traces of carbon dioxide as contaminants in a quantity not greater than 10% by volume of the gas from an envelope of a lighter-than-air aircraft and returning the purified helium to the envelope, comprising:

means to render the contaminated helium below its dew point to condense and separate out water vapor, said means comprising compressor means for compressing the contaminated helium between 20 and 60 bars and an aftercooler means for cooling the contaminated helium to between 0° and 60° C.;

means for supplying contaminated helium from the envelope to said compressor;

means for raising the contaminated helium to above its dew point after condensation and separation of the water vapor;

a first membrane unit comprising a first membrane which is much less permeable to nitrogen and oxygen than it is to helium, a gas inlet, a first gas exit downstream of said first membrane for helium enriched permeate, and a second gas exit upstream of said first membrane for contaminant enriched impermeate;

means for introducing contaminated helium above its dew point after separation of the water vapor at superatmospheric pressure to said gas inlet of said first membrane unit;

means for returning the helium enriched permeate from the first gas exit of said first membrane unit to the envelope;

a second membrane unit comprising a second membrane which is much less permeable to nitrogen and oxygen than it is to helium, a gas inlet, a first gas exit downstream of said second membrane for the passage therethrough of helium enriched permeate, and a second gas exit upstream of said second membrane for the passage therethrough of contaminant enriched impermeate;

means for feeding contaminated enriched impermeated from said second exit of said first membrane unit to said gas inlet of said second membrane unit;

means for feeding helium enriched permeate from said first exit of said second membrane unit to the gas inlet of said first membrane unit; and means for venting contaminant enriched impermeate from said second exit of second membrane unit.

10. Apparatus according to claim 9, wherein said means to render the contaminated helium below its dew point to condense and separate out water vapor includes a separator to separate water vapor condensed from the gas.

11. Apparatus according to claim 10, in which said means to raise the contaminated helium above its dew point comprises gas expansion means disposed between said separator and said input of said first membrane unit.

12. Apparatus according to claim 10, in which said means to raise the contaminated helium above its dew point comprises a heat exchanger between said separator and said input of said first membrane unit which is fed with the contaminated helium rendered not by compression in the compressor means.

* * * * *